L. A. LANG.
CONTROLLING MECHANISM.
APPLICATION FILED JUNE 28, 1916.
1,414,654.
Patented May 2, 1922.
3 SHEETS—SHEET 3.
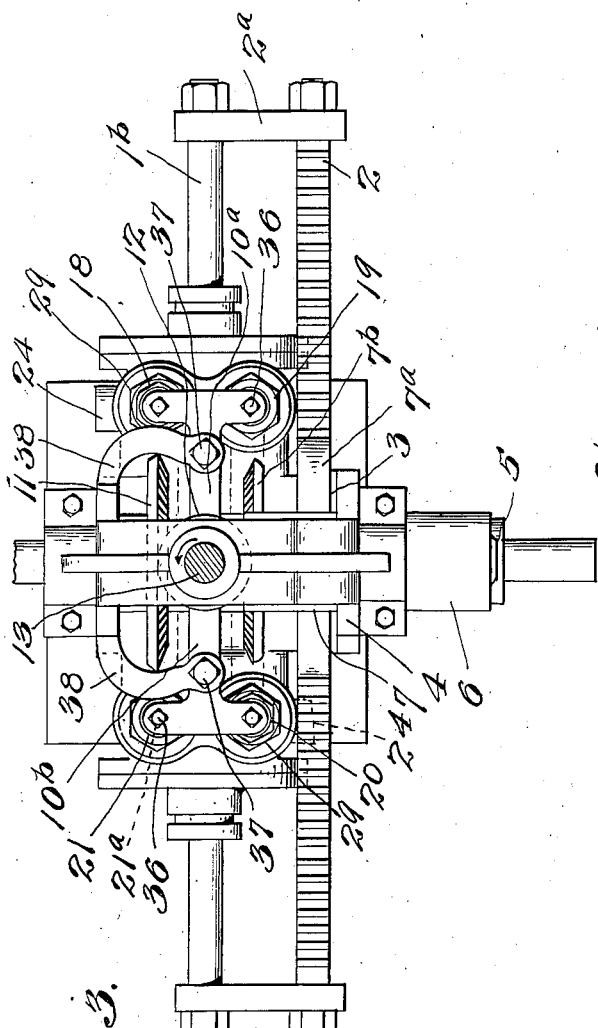
Inventor
Lincoln A. Lang
By Buck, Parker & Smith
Attorney

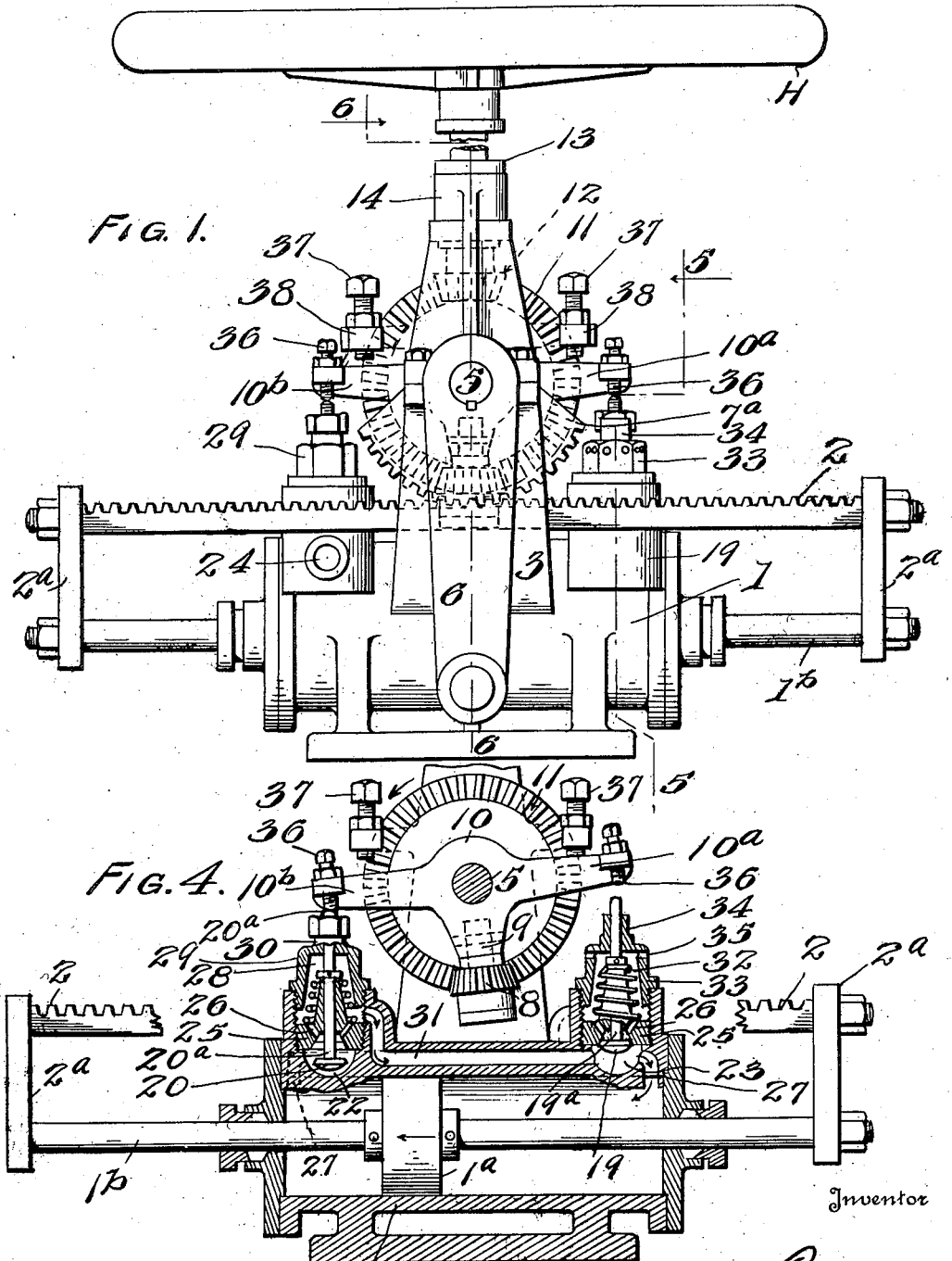

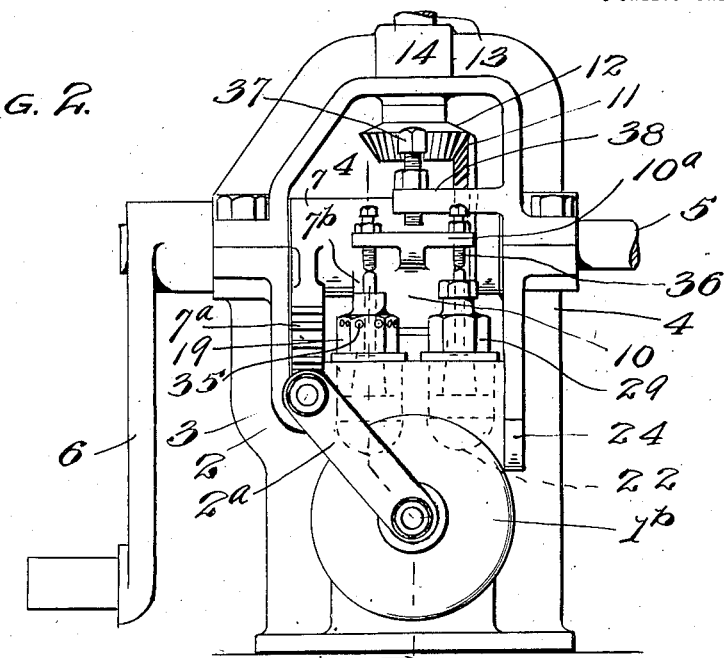
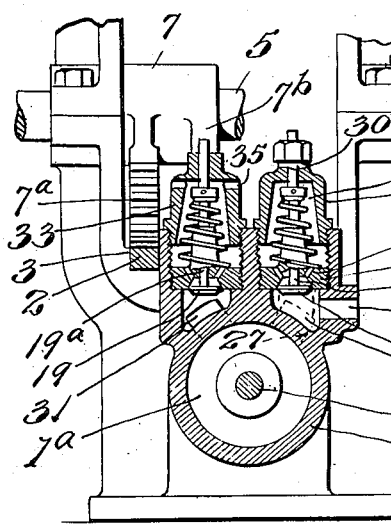
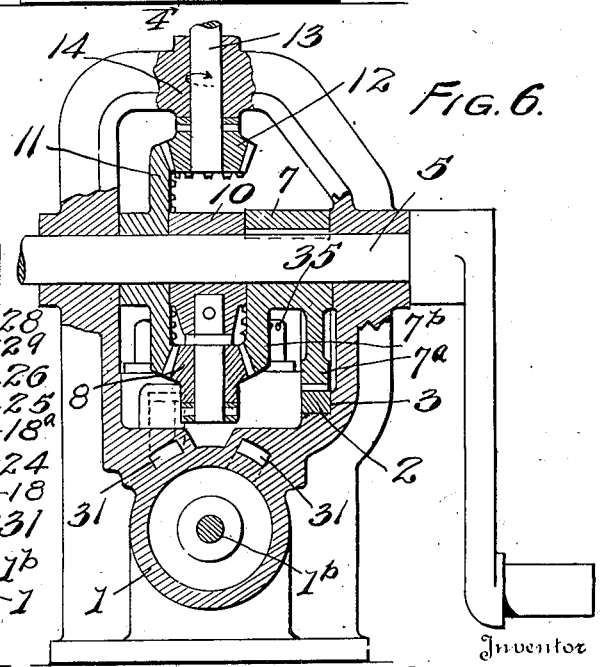

UNITED STATES PATENT OFFICE.

LINCOLN A. LANG, OF CHICAGO, ILLINOIS, ASSIGNOR TO THE NORTHERN TRUST COMPANY, TRUSTEE, OF CHICAGO, ILLINOIS, A CORPORATION OF ILLINOIS.

CONTROLLING MECHANISM.

1,414,654.    Specification of Letters Patent.    Patented May 2, 1922.

Application filed June 28, 1916. Serial No. 106,496.

*To all whom it may concern:*

Be it known that I, LINCOLN A. LANG, a citizen of the United States, residing at Chicago, Illinois, have invented certain new and useful Improvements in Controlling Mechanism, of which the following is a specification.

My controlling mechanism is of that class in which power is applied to move the controlled member to and fro. The application of this power is regulated by a hand controlled device of the controlling mechanism and in preferred forms of this apparatus more or less manual power may be applied to the controlled member through the hand operated device. Means are also provided by which movement of the controlled member under power for a distance appropriate to a certain movement of the hand controlling member neutralizes the effect of the movement of the hand controlled member and effects a discontinuance of movement of the controlled member. Such means may be conveniently described as "follow-up mechanism."

The present invention provides improvements in this class of controlling mechanism and the principal objects of the improvements are to cause the relation of movement of the controlled member to the hand controlling member to be constant throughout their ranges of movement; to cause the movement of the controlled member to be immediately, delicately and accurately responsive to the movement of the controlling member and to more effectively lock the controlled member in position or enable it to automatically resist tendencies to move in either direction when it is desired to be stationary.

These objects are accomplished principally by employing poppet valves to control the motive fluid, valve actuating means suitable to poppet valves, and differential gearing of a certain sort intermediate the hand controlling member, the valve actuating means and the controlled member.

After thorough study of controlling mechanism of this general class, some of which are known as servo-motors, I find that they have usually some or all of the following characteristics: The controlled member does not immediately respond to the movement of the controlling member; the speed or degree of movement, or both of these, of the controlled member do not correspond to the movement of the hand controlling member so accurately as could be desired; the normal or intended ratio of movement of the two members is also different for different parts of the range of movement of the controlling member and the apparatus does not respond so quickly or accurately as could be desired to prevent dislocations of the controlled member from an intended fixed position. I have also discovered that these characteristics are principally, if not entirely, due to the employment of slide valves to control the motive fluid and to the employment in the follow-up mechanism of a lever or some kind of differential mechanism which does not have sufficiently uniform action or is not sufficiently sensitive.

In considering ways of overcoming these difficulties I conceived that poppet valves would have the quick and responsive action necessary to give the improved results that I desired, and that the follow-up mechanism or that part of the mechanism interacting between the hand controlling member, controlled member and valves should embody two similar or uniformly acting differential members, preferably gears, which should act upon the variable member of the differential group uniformly in all positions. But poppet valves are peculiar, in that they are usually seated by a spring and are operated by actively moving them in only one direction, and it was necessary to discover and adapt novel valve actuating means and a novel valve arrangement, and to adapt to these features the desired kind of differential mechanism.

After the adaptation of the various parts along the indicated lines, I have demonstrated that poppet valves can be properly arranged and operated for this purpose by suitable operating means; that they give a substantially immediate response to the movement of the controlling member and avoid the difficulties in previous mechanisms due to the overlap of valves, and that the differential mechanism cooperates properly with the valves to produce the desired delicacy, speed, accuracy and uniformity of ratio of movement of the controlled member to the controlling member, and that moreover the ratio of movement of these parts is constant for all positions of the controlling member.

I will now describe one physical embodiment of the invention, and in connection with this description will further point out the characteristics and advantages of the invention so far as may be necessary. It should be understod that the invention can be embodied in many different forms, and I do not limit myself to details except as claimed hereafter.

The accompanying drawing shows one exemplifying embodiment of the invention:

Fig. 1 is a side elevation.

Fig. 2 is a right hand end elevation.

Fig. 3 is a top plan with the steering wheel removed.

Fig. 4 is a vertical longitudinal section, the main section plane being that of the centres of the two valves at one side of the cylinder.

Fig. 5 is a transverse section through the valves at one end of the cylinder.

Fig. 6 is a transverse section at the centre of the structure.

Fig. 7 is a horizontal section in a plane just above the rack.

In the present embodiment the invention is adapted to steering road vehicles and in such vehicles a convenient motive power is air under pressure, stored in a suitable tank by a pump driven by the vehicle engine. For the sake of brevity, the exemplifying structure will be described as adapted to automobile steering and air will be referred to as the motive fluid, but it will be understood that the invention may be adapted to various other uses such as operating locomotive reverse gearing, the elevating mechanism of gun carriages, etc., and that other motive fluids, such as steam or water or oil under pressure, may be used in some cases.

The cylinder 1 has a piston 1ª whose piston rod 1ᵇ is connected by cross pieces 2ª to a rack bar 2. This slides in a suitable guide 3, which in this embodiment is a part of the cylinder casting. At each end of the cylinder is an exhaust poppet valve 19 closing upon a seat 25 screwed into the cylinder casting. The stems 19ª of these exhaust valves pass upward through cages 33 and are guided in upward extensions 34 of the cages and protrude above these extensions for actuation by suitable means to be described. The valves are held seated by suitable springs according to ordinary poppet valve construction. The valve seat members 25 have perforations 26 to permit discharge of air into the cages 33 and the cages have perforations 35 to discharge the exhaust air to atmosphere.

At each end of the cylinder is an intake poppet valve 20 closing against a seat 25. The stems 20ª of the intake valves pass up through cages 29 and are guided by extensions 30 at the top of the cages and the upper ends of the valve stems protrude above the cages as in the case of the exhaust valves. These intake valves are packed and also have suitable springs, and the valve seat members 25 have perforations 26 for the passage of intake air when the valves are opened.

To permit the valves to be properly actuated by suitable valve actuating mechanism which I have devised for the purpose, and to permit air to be properly supplied and exhausted to and from the cylinder by these valves when so actuated, one intake valve and one exhaust valve are placed as above described at each end of the cylinder, but the similar valves at opposite ends of the cylinder are arranged at opposite sides thereof so that if the cylinder is observed from either end, at the end nearest the observer there is an intake valve 20 at the right and an exhaust valve 19 at the left, while at the further end of the cylinder there is an exhaust valve 19 at the right and an intake valve 20 at the left. Described otherwise, the similar valves at opposite ends of the cylinder are diagonally arranged. This valve arrangement permits air passages to be conveniently and satisfactorily arranged as follows: Below each intake valve 20 is a supply chamber 22 to which air under pressure is supplied from a suitable tank (not shown) through connections 24 in the cylinder casting. From a point above each of the intake valve seats 25 an air passage 31 leads through the cylinder casting to an air chamber 23 below exhaust valve 19 at the opposite end of the cylinder. This air chamber 23 connects by a port 27 with the adjacent end of the cylinder. If intake valve 20 at one end of the cylinder is open, as shown in Fig. 4, air under pressure passes from the supply chamber 22 through perforations 26 in the valve seat to the cage 29, and from the cage through passage 31 to chamber 23 at the opposite end of the cylinder and from this chamber through the port 27 to the cylinder. If the valve 19 above the chamber 23 is closed, as shown in Fig. 4, air is prevented from escaping at that end of the cylinder. If at the same time, the exhaust valve 19 directly behind the intake valve 20 in Fig. 4, or at the left in Fig. 5, is opened, air will pass through the port 27 at that end of the cylinder, through the chamber 23 at the left in Figs. 4 and 5 and through the perforations in the exhaust valve seat to the cage 33 and through perforations 35 in the cage to atmosphere. If the intake valve at the opposite end of the cylinder, that is, directly behind the valve 19 as seen in Fig. 4, remains closed, there will be no supply of air to the left hand end of the cylinder at this time. By the simultaneous opening, that is, of an exhaust valve and an intake valve at one end of the cylinder, air is exhausted from that end and is supplied to the opposite end of the cylinder owing to the arrangement of the air passages, and the piston is moved toward the first mentioned end of the cylinder, and similarly by simultaneously opening the supply and exhaust valve at the other end of the cylinder the piston will be caused to move in the opposite direction. Suitable valve actuating means will now be described.

Uprights 3 extending from the cylinder casting carry in suitable bearings a rock shaft 5, and on this is mounted for relative oscillation the hub 10 of a valve operating member, comprising in connection with the hub, arms $10^a$ and $10^b$ each of which carries two adjustable valve tappets 36. The lower end of one of the tappets lies above the upper end of each vave stem so that when the rocker is moved in one direction its tappets 36 depress the stems of an intake and exhaust valve at the corresponding end of the cylinder, while the two valves at the opposite end are held closely by their springs, and similarly opposite movement of the rocker will open the two valves at the other end of the cylinder while the two first mentioned are held closed by the springs.

To enable the valve actuating rocker 10 to be controlled mutually by the hand controlling member and the controlled member of the mechanism, suitable differential gearing, in which is incorporated a suitable follow-up mechanism, is provided as follows: The rocker hub 10 has another arm 9 on which is revolubly mounted a beveled differential pinion 8. One side of this pinion engages a bevel gear sector $7^b$ carried by a hub 7 keyed to shaft 5. This hub also carries a spur gear sector $7^a$ engaging the rack bar 2 previously mentioned. The other side of differential pinion 8 engages a bevel gear 11 of which a part equal in size to the sector $7^b$ constitutes the other member of a differential couple similar to the sector $7^b$. This gear 11 is revolubly mounted on shaft 5 and for convenience has a gear of full circumference so that it can also be engaged by a bevel pinion 12 carried on controlling shaft 13 revolubly mounted in suitable bearings 14, and carrying at its upper end the hand controlling member, in this instance a hand wheel H. It will be evident that the gear member 11 might be simply a sector similar to the sector $7^b$ and might be operated by placing a handle directly upon its hub. The present arrangement is to adapt the controlling mechanism to conditions usually found in automobiles.

Rigidly fixed on shaft 5 is an arm 6 which constitutes the controlled member of the mechanism. This is to be connected in any suitable way to the member to be operated. In this instance, the arm is to be connected directly to the usual drag link of the steering wheels of an automobile.

Stops are preferably provided for the rocker 10, consisting in this embodiment of adjustable screws 37 carried by arms 38 rigidly secured to the frame. The lower ends of screws 37 rest above arms $10^a$ and $10^b$ of the rocker and limit its movement in an obvious way.

The operation is as follows: When the hand controlling member H is rotated in either direction so that the steering shaft 13 rotates in the direction of the arrow, Fig. 6, the movement of steering arm 6 is momentarily resisted by its connection with the steering wheels of the vehicle, and the bevel sector $7^b$ connected rigidly with this arm thus acts momentarily as an abutment. The rotation of bevel pinion 12 carried by the steering shaft rotates bevel gear 11, and this causes rotation of bevel pinion 8 upon its axis. The engagement of the pinion with the gear $7^b$, now stationary, causes the rocker 10 to oscillate upon shaft 5 in such a direction that the arm $10^b$ is depressed and exhaust valve 19 and intake valve 20 at the left end of the cylinder, as seen in Fig. 4, are opened. Air is thus exhausted from the left hand end of the cylinder and supplied to the right hand end through passage 31; the piston $1^a$ and rod $1^b$ are moved to the left and rack bar 2 is similarly moved; this bar being in engagement with spur sector $7^a$ causes the controlled member 6 to move to the left in Fig. 1 or toward the observer's eye in Fig. 6, and the steering wheels of the vehicle are deflected correspondingly. Bevel gear sector $7^b$ moves in correspondence with the movement of the controlled member 6 and causes a compensating movement of the bevel pinion 8, or, in other words, causes the pinion to have a follow-up movement so that substantially as soon as movement of the hand controlling member ceases the gear 11 acts as an abutment and movement of gear sector $7^b$ restores pinion 8 to its normal position, bringing the rocker 10 back to intermediate position and causing the two valves at the left end of the cylinder to be closed, whereupon the controlled member 6 is promptly stopped and so held. Opposite movement of the hand wheel will cause opposite movement of the controlled member in an obvious way. The mechanism has an inherent capacity to resist and compensate for outside disturbances which tend to move the controlled member 6. For instance, suppose that road shock causes a deflection of the steering wheels of the car, which tends to move the arm 6 to the left in Fig. 1, or toward the observer's eye in Fig. 6. This movement will at once be communicated through shaft 5 to the spur sector $7^a$, and so through the rack bar 2 and piston rod $1^b$ to the piston; the piston is to a certain extent locked by the fluid pressure in the cylinder and movement of the arm 6 is at first resisted by these means. But if the arm moves to any appreciable extent the gear sector 7ᵇ is correspondingly moved; the hand wheel H being lightly held by the driver or even remaining stationary by its own inertia, or by a suitable latch which may be provided, the gear 11 now acts as an abutment and the movement of sector 7ᵇ causes rotation of the bevel pinion 8, and a rotation of the rocker 10 in such direction that the arm 10ᵃ of the rocker is depressed and the valves at the right hand end of the cylinder in Fig. 4 are opened; this causes movement of the piston to the right in Fig. 4 sufficiently to compensate for the disturbance of controlled member 6 and to keep it in substantially fixed position without the attention of the operator or without any appreciable physical exertion.

In addition to the automatic power control and follow-up capacity of the mechanism described, it has the additional advantage that manual effort applied to the hand controlling member may be communicated to the controlled member in proportion to any partial or complete failure of the power means, or to any extent desired, if the power means is partly or entirely eliminated by intention; and this application of manual effort to the controlled member may be instantaneously made without conscious thought of the operator and without manipulating any part of the mechanism except the hand controlling member itself. Moreover, the movement of the hand controlling member at any stated speed and for any stated distance will cause the same movement of the controlled member, whether that movement is accomplished entirely by the manual effort of the operator or entirely by power or by any combination of the two. When the hand wheel H is moved a short distance in either direction, if the motive fluid does not act with great promptness to move the controlled member and so to restore the rocker 10 to normal position, or to compensate for the movement of the hand wheel, the said slight movement of the hand wheel acts through the differential mechanism to move the rocker 10 to the limit of its travel in either direction, that is to cause one of the rocker arms to engage with its stop 37. Thereupon, the rocker serves as an abutment for the transmission of manual effort from bevel pinion 12, through gear 11, to pinion 8, and the gear sector 7ᵇ is thus moved in the appropriate direction and the controlled member 6 is also moved in the proper direction. The manual effort required for the movement of the controlled member will evidently be in proportion to the failure of the power means, because the valves are actuated in the described movement of the hand wheel, and the power means will act to move the controlled member up to its capacity.

Different adjustments of the valve actuating means may be made to produce different results, but in a preferred adjustment of the mechanism the tappets 36 are so adjusted that when the rocker 10 is in intermediate position the intake valve tappets have no clearance from the stems of the intake valves and the intake valves are barely closed, or even very slightly opened, or, to use descriptive language, just fluttering on their seats, while there is a very slight clearance between the exhaust valve tappets and the exhaust valve stems. In this way there is always pressure in each end of the cylinder tending to hold the piston effectively balanced, and upon the slightest movement of the rocker in either direction one of the intake valves is immediately firmly seated while the appropriate exhaust valve is opened and the other intake valve is fully opened and fluid is thus freely exhausted from one end of the cylinder and supplied to the other and the piston is promptly moved a distance proportionate to the movement of the hand wheel. The employment of poppet valves is of great importance in this mechanism because they give an immediate response to the movement of the hand controlling member without any delay or uncertainty of action due to the necessary overlap in slide valves. The differential gearing employed is also such that in any of the positions of the gearing a stated movement of the hand wheel, either as to distance or speed, will cause the same movement of the controlled member. This is because the differential gear sectors 7ᵃ and 11 are exactly similar, and are, moreover, of uniform shape and act uniformly upon the differential pinion 8 in all positions. There is, therefore, no uncertainty in the compensation afforded by the mechanism or in the capacity of the machine to automatically resist outside disturbances, such as is the case in controlling mechanism employing compensating levers or other devices which do not have a uniform action in all their positions.

Since the poppet valves employed in my construction have a substantially instantaneous response to the movement of the hand controlling member, there is no perceptible delay in the response of the controlled member to the movement of the controlling member, and since the follow-up mechanism has the uniform action just described, and since the closing of the poppet valves is just as prompt and immediately effective as their opening movement, the controlled member will stop without any perceptible over stroke or delay immediately upon stoppage of movement of the hand controlling member. Moreover, whatever the degree or speed of movement of the hand controlling member may be, the controlled member will follow it proportionately with the greatest promptness and accuracy. It will be evident that when the power means is normally effective, the compensating mechanism acts continually to tend to restore the rocker 10 to normal or immediate position, and it will be practically impossible to cause the rocker to encounter its fixed stops if any considerable latitude of movement is permitted by the stops, for the reason that the controlled member follows the action of the hand controlling member so promptly that the hand controlling member can hardly be moved quickly enough to cause any very great considerable depression of the valve operating rocker in either direction. The clearance afforded by the stops 37 may, therefore, be very slight and such that if the power means fails partially or wholly at any time, this clearance will be taken up by an almost imperceptible movement of the controlling member and there will, therefore, be no perceptible or objectionable delay in the application of manual power to the controlled member, because the rocker 10 will substantially immediately encounter one of the stops 37 and act as an abutment for the conveyance of manual power to the controlled member.

I claim:—

1. In a servo-motor, the combination of a hand-controlling member, a member controlled thereby and movable by power, fluid pressure mechanism for moving said controlled member to and fro, and valve mechanism for delivering and discharging fluid to and from said fluid-operating mechanism, said valve mechanism being mechanically connected to both of said members and arranged to be actuated by movement of either of said members relative to the other, and including a pair of inlet poppet valves adapted to open alternately upon actuation of said valve mechanism in opposite directions, at least one of said valves always being open, and a pair of poppet exhaust valves also alternately operable by opposite movements of said valve-actuating mechanism, and adapted to remain closed contemporaneously during a substantial movement of said controlled member.

2. In a servo-motor, the combination of a hand controlling member, a member controlled thereby and movable by power, fluid pressure mechanism for moving said controlled member to and fro, and valve mechanism comprising inlet valves and exhaust poppet valves and valve actuating means connected with the controlling member and the controlled member, said valves and valve actuating means being constructed and arranged so that at least one of the inlet valves is always open, and so that the valve actuating means may move considerably to actuate the inlet valves while the exhaust valves remain closed.

3. In controlling mechanism of the class described, the combination of a cylinder, a piston, inlet poppet valves and exhaust poppet valves to control the flow of expansive fluid to and from opposite ends of the cylinder, a hand controlling member, and differential mechanism intermediate the piston, valves and hand member, said mechanism comprising a gear operated by the hand member, another gear operated by the piston, and a differential pinion actuated by said gears, said pinion being connected with the valves.

LINCOLN A. LANG.